Nov. 20, 1951 J. E. CORDES 2,575,999

PIEZOELECTRIC PHONOGRAPH PICKUP

Filed May 18, 1949

Inventor
JOHN E. CORDES

By Francis J. Klempay,
Attorney

Patented Nov. 20, 1951 2,575,999

UNITED STATES PATENT OFFICE 2,575,999

PIEZOELECTRIC PHONOGRAPH PICKUP

John E. Cordes, Lakeville, Ohio, assignor to The Astatic Corporation, Conneaut, Ohio, a corporation of Ohio Application May 18, 1949, Serial No. 93,929

3 Claims. (Cl. 179—100.41)

This invention relates to an improved mechanical-electrical transducer of the cartridge type normally employed in the outer free end of a pivotally mounted tone arm in an electric phonograph assembly. The primary object of the invention is the provision of an improved pick-up cartridge for use as indicated which is highly efficient in operation but which is easy to produce and assemble and entirely capable of being embodied in various small dimensions and of extremely light weight. The invention therefore seeks to extend the range of utility of electric phonograph pick-up cartridges in that the same may be embodied in recorded sound reproducing apparatus of small size and of the kind requiring a very small stylus operating pressure.

Another object of the invention is the provision in a unitary pick-up cartridge assembly for use in electric phonographs of an improved arrangement for securing the mechanical-electrical transducer element and the record-engaging stylus in the casing of the assembly. The latter is particularly improved by the present invention in that the usual complicated stylus holder is entirely eliminated, thereby materially reducing the mass and the inertia of the stylus and holder assembly and in that the stylus is held in place without the use of screws or other fastening devices requiring the application of tools when changing the stylus. The improvements in the transducer element mounting reside principally in the elimination of any soldered connections to the element and in the simplification of the arrangement for physically supporting the element in the cartridge casing. According to the present invention the casing is preferably made in two halves which upon assembly clamp electrical contacts and resilient supporting pads onto opposite sides of the transducer element while also clamping a supporting block for the stylus in proper position. To complete the assembly it is only necessary to snap the styus in position.

A further object of the invention is the provision of an improved stylus coupling for a piezoelectric transducing element for an electric phonograph pick-up whereby while a direct and short connection is provided between the stylus tip and the element the stylus structure in itself acts as a guard to limit the application of excessive bending forces to the element.

The above and other objects and advantages of the invention will become apparent upon consideration of the following detailed specification and the accompanying drawings wherein there is disclosed a preferred embodiment of the invention.

Figures 1, 2, 3, 4, 5, 6, 7:
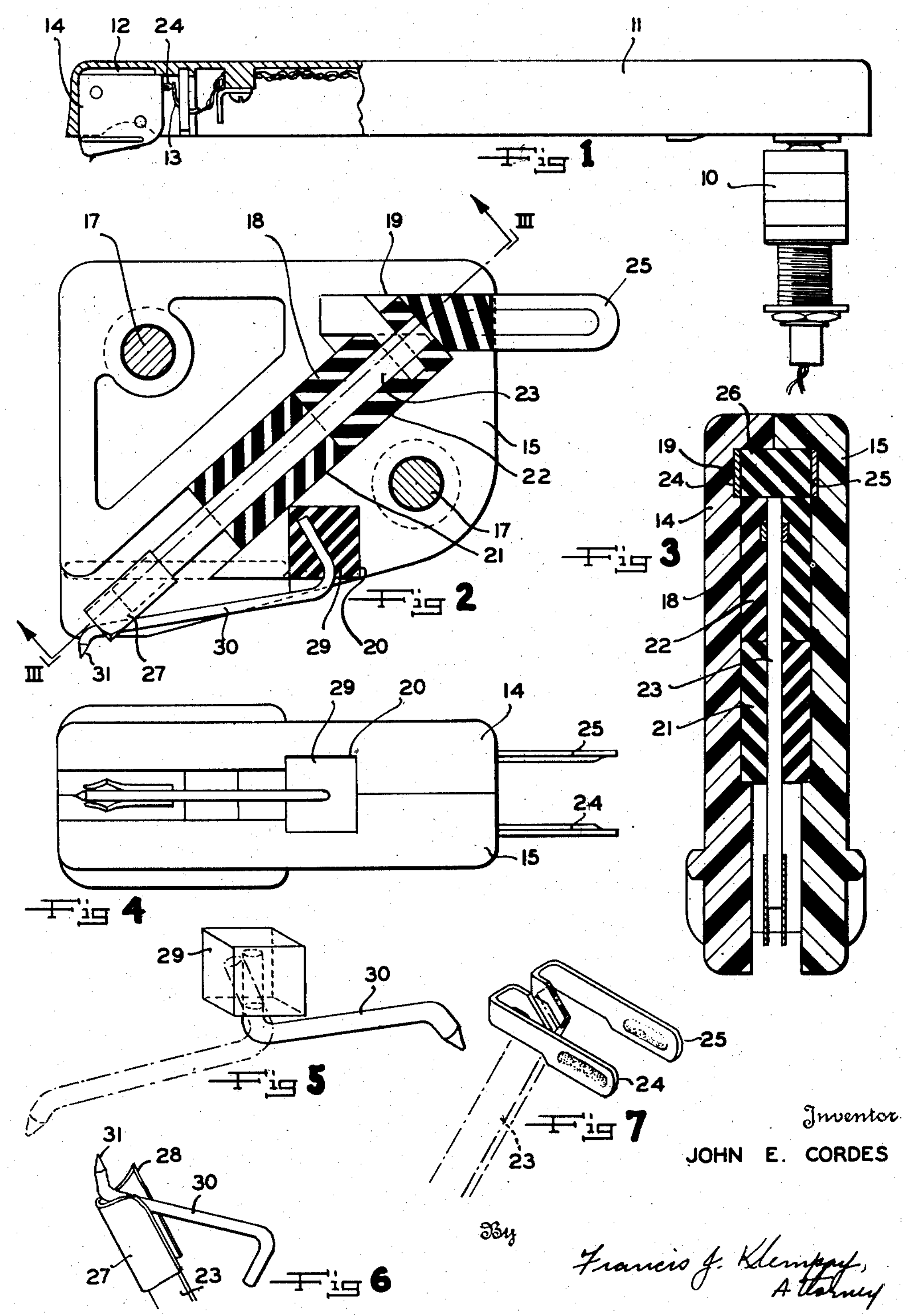
Figure 1 is a side elevation, partly in section of an assembled electric phonograph tone arm and pick-up cartridge constructed according to the principles of the invention.
Figure 2 is a longitudinal section through the pick-up cartridge of Figure 1.
Figure 3 is a sectional view taken along the line III—III of Figure 2.
Figure 4 is a bottom plan view of the cartridge of Figures 1 and 2.
Figure 5 is a detached perspective view of the stylus and mounting block therefor and illustrating the manner of securing the dead end of the stylus in the assembled cartridge.
Figure 6 is a detailed view of the interconnection between the stylus and the piezoelectric transducer element.
Figure 7 is a detailed view of the electrical contacts used in the assembly of the cartridge.

In the drawing, reference numeral 10 designates generally a mounting post on which is pivotally mounted for movement about vertical and horizontal axes an arm 11 having a socket 12 at its outer free end. The socket 12 is adapted to slidably receive and retain the cartridge of the invention and for the purpose of automatically establishing electrical connection between the cartridge and suitable conductors housed in the arm 11 there is provided a pair of spring contacts 13 which are fixed on a suitable support formed in the arm 11.

Referring more particularly to Figures 2, 3 and 4, the cartridge of the invention comprises a pair of opposed casing sections 14 and 15 which are preferably of molded construction to provide a pair of spaced apertures 17, a diagonally extending recess 18, a wider and horizontally extending recess 19 in the upper rear portion of the assembly communicating with the recess 18 and a wider recess 20 opening upward from the lower edge of the assembled casing. Clamped between the upper end portions of the opposing side walls of the recess 18 by means of the rubber blocks 21 and 22 is the piezoelectric mechanical-electrical transducing element comprising an elongated strip 23. For the purpose of this invention the transducer element 23 is preferably of the ceramic type utilizing a pair of polarized barium titanite slabs laminated on opposite sides of a neutral member so that upon bending of the composite strip a potential is developed across the outer side surfaces of the strip. In order to connect such outer side surfaces to an output circuit I provide a pair of highly conductive terminal members 24 and 25 which are recessed in the recess 19 and which are U-shaped at their inner ends to engage the opposite side surfaces of the transducer strip 23. To secure the contact members 24 and 25 in proper spaced relation a rubber insulating block 26 is inserted in the recess 29 between the center portions of the horizontal reaches of the contact members. By referring to Figure 1 it will be noted that upon a sliding movement of the cartridge into the socket 12 of the arm 11 the rear ends of the contact members 24 and 25 will slidably engage the spring contacts 13 to establish electrical connection as will be understood.

Rigidly secured to the lower end portion of the strip 23 by means of a suitable insulating cement, for example, is a metal channel-shaped member 27 which extends down below the lower end of the strip 23, which is open along its lower edge and which has its lowermost edge surfaces flared outwardly as shown at 28 in Figure 6. Rigidly clamped in the recess 20 is a rubber block 29 which is formed with an upwardly disposed bore or aperture to tightly receive an upwardly bent end portion of a stylus member 30 consisting of a bent piece of wire having a record-engaging tip 31 secured thereto. As shown, the stylus 30 is also provided with a downwardly bent forward end portion to position the tip 31 in proper angular relation with respect to a record groove and immediately adjacent such downwardly bent forward end portion the stylus is frictionally received between the flanges of the channel member 27. The rear end portion of the stylus wire 30 is bent upwardly at slightly more than ninety degrees so that upon assembly of the parts as shown in Figure 2 the rear end portion of the stylus wire will be effectively restrained against movement in a downward direction. The stylus 30, however, is in effect pivoted in the block 29 so that the lateral movement imparted to the stylus tip 31 by the undulations in the record groove are effectively transmitted to the coupling 27 and to the lower end of the piezoelectric element 23. To bias the forward end portion of the stylus member 30 into frictional engagement with the coupling member 27 the bore in the block 30 is made in a vertical direction so that the displaced rubber in the block 29 always coacts with the upwardly extending rear end portion of the stylus member 30 to tilt the forward end portion thereof upwardly when the parts are assembled as shown in Figure 2.

It should now be apparent that I have provided an improved pick-up cartridge assembly for an electric phonograph which accomplishes the objects initially set out. The component parts are minimum in number, are readily produced by economical production methods as molding and stamping, for example, and are readily assembled simply by laying certain parts in the respective halves of the casing and riveting the halves together through the use of suitable rivets which pass through the apertures 17. The stylus member is readily incorporated in the assembly both for initial manufacture and for replacement simply by inserting the same in the coupling 27 and the block 29, as will be understood. Because of the extreme simplicity of the assembly the same may be made very small in dimension and light in weight, as well as at low cost. The diagonal arrangement of the piezoelectric element enables an element of maximum length to be incorporated in a casing of small size and the substantially direct coupling between the stylus tip and the lower flexing end of the transducer element makes for high fidelity of operation through reduction of inertia of the moving parts, as will be understood by those familiar with the art.

The above specifically described embodiment of the invention should be considered as illustrative only as obviously many changes may be made therein without departing from the spirit or scope of the invention. Reference should therefore be had to the appended claims in determining the scope of the invention.

I claim:

1. A pick-up cartridge for an electric phonograph comprising a casing adapted to be secured in the outer free end of a tone arm, an elongated piezoelectric transducer positioned in downwardly inclined relation in said casing, means to resiliently clamp the upper end portion of said transducer in said casing with the lower end portion of the same being freely disposed, a coupling member rigidly secured to the lower free end of said transducer, a rubber block secured in said casing below said transducer, and an elongated stylus having a bent end portion embedded in said block and having a downwardly disposed record-engaging tip at its opposite end, said stylus being removably received in said coupling member at a point adjacent said tip, and the bent end portion of said stylus which is embedded in said block having acute angular relation with the principal axis of the stylus.

2. A pick-up cartridge for an electric phonograph comprising a casing adapted to be secured in the outer free end of a tone arm, a piezoelectric transducer positioned in said casing, means in said casing to resiliently clamp a portion of said transducer with another portion of said transducer being freely disposed whereby said transducer may be flexed for the generation of an electric potential, a coupling member rigidly secured to and carried by the freely disposed portion of said transducer, a resilient but compliant block secured in said casing in spaced relation to said freely disposed portion of said transducer, and an elongated stylus having an end portion embedded in said block and having a downwardly disposed record-engaging tip at its opposite end, said coupling member comprising a wedge-shaped recess and said stylus being removably received in said recess at a point adjacent said tip, the resilient mass of said block being operative to yieldingly urge said stylus into pressure engagement with said recess.

3. A pick-up cartridge for an electric phonograph comprising a casing adapted to be secured to the outer free end of a tone arm, a piezoelectric transducer positioned in said casing, means in said casing to resiliently clamp a portion of said transducer with another portion of said transducer being freely disposed whereby said transducer may be flexed for the generation of an electric potential, a coupling member rigidly secured to the freely disposed portion of said transducer and being supported wholly on said transducer, said coupling member having a wedge-shaped recess, an elongated stylus removably anchored in said casing at a point spaced from said coupling and having an integral portion received in said recess, the mounting for said stylus being operative to bias said integral portion into pressure engagement with said recess, and a record engaging tip on said stylus adjacent said integral portion.

JOHN E. CORDES.

REFERENCES CITED

The following references are of record in the file of this patent:

UNITED STATES PATENTS

| Number | Name | Date |
|---|---|---|
| 2,181,437 | Norton | Nov. 28, 1939 |
| 2,328,952 | Burt | Sept. 7, 1943 |
| 2,363,497 | Begun | Nov. 28, 1944 |

FOREIGN PATENTS

| Number | Country | Date |
|---|---|---|
| 180,787 | Great Britain | 1922 |